United States Patent [19]

Su

[11] 4,311,808

[45] Jan. 19, 1982

[54] CLING FILM COMPOSITION OF OLEFIN POLYMER BLEND

[75] Inventor: Chung-Sin Su, Verdun, Canada

[73] Assignee: Union Carbide Canada Limited, Toronto, Canada

[21] Appl. No.: 189,877

[22] Filed: Sep. 23, 1980

[30] Foreign Application Priority Data

Oct. 5, 1979 [CA] Canada ................................. 337125

[51] Int. Cl.$^3$ ...................... C08L 23/06; C08L 23/08; C08L 23/20; C08L 31/04
[52] U.S. Cl. .................................... 525/222; 525/240
[58] Field of Search ................................ 525/240, 222

[56] References Cited

U.S. PATENT DOCUMENTS

| | | | |
|---|---|---|---|
| 3,321,427 | 5/1967 | Tyran ................................. | 525/222 |
| 3,682,767 | 8/1972 | Britton et al. ...................... | 525/222 |
| 3,932,563 | 1/1976 | Argurio et al. ..................... | 525/222 |
| 4,113,804 | 9/1978 | Cotten et al. ....................... | 525/240 |

Primary Examiner—Carman J. Seccuro
Attorney, Agent, or Firm—William G. Hopley; Albert E. Koller; James C. Arvantes

[57] ABSTRACT

A film forming composition was prepared which comprises a homogeneous mixture of (a) from 2% to 10% by weight of polyisobutylene having a Staudinger molecular weight of from 3,000 to 50,000; (b) from 3% to 20% by weight of an ethylene-propylene copolymer rubber having a melt index of from 0.2 to 2.0 dg/min. and an ethylene/propylene copolymerization ratio of from 30/70 to 70/30 and (c) the remainder of the mixture being an olefin polymer selected from polyethylene having a density of from 0.915 to 0.930 gm/cc and a melt index of from 0.3 to 5.0 dg/min. and an ethylene-vinyl acetate copolymer wherein vinyl acetate comprises up to 20% of the copolymer. Film prepared from the composition exhibited improved cling properties down to at least −40° C.

8 Claims, No Drawings

CLING FILM COMPOSITION OF OLEFIN POLYMER BLEND

This invention relates to a polyolefin film forming composition for packaging applications. More particularly, it relates to a polyolefin based stretch-wrapping film having improved self-cling properties even at low temperature.

Other polyethylene based overwrap film include cling agents such as mono- or di-glycerides of fatty acids as described in U.S. Pat. Nos. 3,048,263 and 3,501,363, or are coated with adhesives. Such films however tend to loose their cling enhancing properties at low temperatures. This is a disadvantage where objects have to be maintained in their wrapping or shipped at low temperatures. Film formulations with poly (vinyl chloride) may require the use of plasticizers which can mitigate onto the wrapped articles. Also, poly(vinyl chloride) film is less capable of holding a wrapped pallet during storage or transportation than low density polyethylene. Furthermore, if poly(vinyl chloride) film is overheated or burnt, toxic gases may evolve.

It has been discovered that by adding from 2% to 10% by weight of polyisobutylene within the required molecular weight range and from 3% to 20% by weight of certain elastomers to the polyolefin component in a homogeneous mixture there results a composition having improved self-cling properties even when maintained for long periods of time at temperatures at least as low as −40° C. The film composition also retained good tensile, puncture and tear strength and appearance which is comparable to unmodified low-density polyethylene.

It has been found that the polyisobutylene used in the mixture should have a Staudinger molecular weight of from 3,000 to 50,000 with a preferred range being from 7,000 to 20,000. The elastomer should be an ethylene-propylene copolymer having a melt index of from 0.2 to 2.0 dg/min. as per ASTM D1238 at 190° C., 44 psig. and an ethylene-propylene copolymerization ratio of from 30/70 to 70/30. The preferred elastomer is an ethylene-propylene copolymer having a melt index of from 0.35 to 0.5 dg/min. and an ethylene-propylene copolymerization ratio of from 40/60 to 60/40. The olefin polymer suitable as the base material for the film composition is preferably low-density polyethylene, in the range of from 0.3 to 5.0 dg/min. (ASTM 1238). However, certain copolymers of ethylene-vinyl acetate have been found to be suitable such as those containing up to 20% vinyl acetate. Other functional groups may also be substituted for vinyl acetate in the copolymer with suitable results.

Minor amounts of antioxidant can be added to the film for stabilization. Other additives such as a small quantity of polypropylene with a melting point of below 175° C. and compatible with the olefin polymer component in the mixture may also be used if desired. The quantities to be added should be determined empirically for each additional component and should be below 4% by weight of the total composition. Certain additives, particularly the surface active type such as amide slip agents may degrade the cling properties of the film composition and should be used with caution.

It is an object of one aspect of this invention to provide a polyolefin film having improved self-cling properties at temperatures to at least as low as −40° C. while retaining good strength characteristics and appearance for pallet overwrapping.

It is therefore an object of another aspect of this invention to provide a film composition which comprises a homogeneous mixture of:

(a) from 2% to 10% by weight of polyisobutylene having a Staudinger molecular weight of from 3,000 to 50,000, (b) from 3% to 20% by weight of an ethylene-propylene copolymer rubber having a melt index of from 0.2 to 2.0 dg/min. and an ethylene/propylene copolymerization ratio of from 30/70 to 70/30, (c) the remainder of said mixture being an olefin polymer selected from the group consisting of polyethylene having a density of from 0.915 to 0.930 gm/cc and a melt index of from 0.3 to 5.0 dg/min. and ethylene-vinyl acetate copolymer wherein vinyl acetate comprises up to 20% of the copolymer.

In the following examples which illustrate the invention, the data given with respect to the cling characteristics refer to 1 mil film samples made from the respective compositions, which were tubular blown and sheeted film extruded from the specified homogeneous mixture from a 2½ inch screw extruder with a 5 inch die, a blow-up ratio (Bubble Diameter/Die Diameter) of about 3:1 and a Frost Line height of 1½ feet at a die temperature of approximately 205° C. These extrusion particulars however are not limitations and other methods of film extrusion well known in the industry can be used.

Instant cling qualities were determined by observation. Other characteristics such as tensile strength, yield strength, tensile elongation, puncture resistance, haze and gloss were measured according to the American Society of Testing and Materials procedures D882, D1003 and D2457. In all of the following examples, the samples contained the antioxidant Irgonox* 1010 at 0.015% by weight.

*Trade Mark

EXAMPLE 1

Various homogeneous mixtures were prepared comprising: (a) polyisobutylene having a Staudinger molecular weight of approximately 10,000, a viscosity average molecular weight of 50,000 and a number average molecular weight of 8,000 in various concentrations, (b) 10% by weight of an ethylene-propylene copolymer having an ethylene/propylene ratio of from 40/60 to 60/40 and a melt index between 0.35 and 0.5 dg/min. as determined by ASTM test D1238 at 44 psig and 190° C., (c) the remainder of the mixture being polyethylene having a density of 0.9225 gm/cc as determined by ASTM test D1505 and a melt index of 0.8 dg/min. as determined by ASTM test D1238 at 44 psig and 190° C. The properties obtained with various concentrations of polyisobutylene (PIB) were determined on samples extruded into film. Results were as follows:

| PIB Conc. Wt % | Haze/ 45° Gloss % | Instant Cling | Tensile Strength psig MD/TD | Yield Strength psig MD/TD | Tensile Elongation % MD/TD | Puncture Resistance in lbs. |
|---|---|---|---|---|---|---|
| 0 | 5/60 | Slight | 3600/ | 1400/ | 400/300 | 13 |
| 2 | — | Fair | — | — | — | — |
| 3 | — | Good | — | — | — | — |
| 5 | 5/60 | Excel- | 3400/ | 1500/ | 300/700 | 12 |

-continued

| PIB Conc Wt % | Haze/ 45° Gloss % | Instant Cling | Tensile Strength psig MD/TD | Yield Strength psig MD/TD | Tensile Elongation % MD/TD | Puncture Resistance in lbs. |
|---|---|---|---|---|---|---|
| | | lent | 3000 | 1200 | | |

The cling strength of the film increased with the increase in the concentration of polyisobutylene. By instant cling we refer to the strength required to separate two layers of film. Such tests were conducted repeatedly on the film specimens and the cling characteristics were compared to those of poly(vinyl chloride) film. It was found that the above containing 3% polyisobutylene had cling strength approximately equivalent to that of poly(vinyl chloride) film. The sample containing 5% polyisobutylene exhibited superior cling strength even after repeated contact and separation of film samples.

EXAMPLE 2

This example illustrates the effect of various concentrations of the ethylene-propylene copolymer in the mixture containing 5% by weight of the polyisobutylene of Example 1 and the remainder of the mixture being low density polyethylene as in Example 1.

| Wt % Copolymer | Instant Cling | Tesnile Strength psig MD/TD | Yield Strength psig MD/TD | Tensile Elongation % MD/TD | Puncture Resistance in lbs |
|---|---|---|---|---|---|
| 0 | None | — | — | — | — |
| 5 | Good | 3600/ 3000 | 1600/ 1000 | 300/600 | 11 |
| 10 | Excellent | 3400 300 | 1500/ 1200 | 300/700 | 12 |

The presence of the ethylene-propylene copolymer is necessary for desirable cling properties to occur. With polyisobutylene alone in the low density polyethylene, no instant cling was observed even at 30% by weight of polyisobutylene. At a concentration of 5% of the copolymer, for example, instant cling was observed to a satisfactory degree.

EXAMPLE 3

This example illustrates the effect of varying the melt indicies, densities and gloss of the major component, low-density polyethylene. The mixture also comprised 5% by weight of the polyisobutylene of Example 1 and 10% by weight of the ethylene-propylene copolymer of Example 1.

| Polyethylene Used | Melt Index of Polyethylene | Typical 45° Gloss of Polyethylene | Instant Cling |
|---|---|---|---|
| LDPE (A) | 0.8 | 55 | Excellent |
| LDPE (B) | 4.5 | 50 | Fair |
| LDPE (C) | 1.2 | 55 | Good |
| LDPE (D) | 0.3 | 35 | Poor |

Increased gloss of the polyethylene yields increased cling properties.

EXAMPLE 4

This example illustrates the effect on cling using different elastomers. The mixture comprised 10% by weight of various elastomers in each case, 5% by weight of the polyisobutylene of Example 1, a small amount of a polypropylene powder having a melting point below 175° C. in those samples as indicated and the remainder of the mixture being the low-density polyethylene of Example 1.

| Ethylene-Propylene Copolymer | Polypropylene Wt % of total mixture | Cling Property |
|---|---|---|
| Elastomer (A) | None | Excellent |
| Elastomer (B) | None | Very Good |
| Elastomer (B) | 1% | Excellent |
| Elastomer (B) | 2% | Good |
| Elastomer (B) | 4% | Fair |
| Elastomer (C) | None | Good |
| Elastomer (D) | None | Good |
| Elastomer (E) | None | Very Good |
| Elastomer (F) | None | Poor |
| Elastomer (G) | None | Poor |
| Elastomer (H) | None | Poor |
| Elastomer (I) | None | Poor |

In the above example the characteristics of the various elastomers are as follows:

Elastomer (A)—an ethylene-propylene copolymer rubber having an ethylene/propylene ratio of from 40/60 to 60/40 and a melt index of from 0.35 to 0.5 dg/min. (ASTM test D1238 at 44 psig and 190° C.)

Elastomer (B)—an ethylene-propylene copolymer rubber having an ethylene/propylene ratio of approximately 50/50 to 70/30 and a melt index of 0.35 to 0.5 dg/min.

Elastomer (C)—an ethylene-propylene copolymer rubber having a Mooney viscosity of approximately 30 and a nominal ethylene content of 60%

Elastomer (D)—an ethylene-propylene copolymer rubber having a Mooney viscosity of approximately 40 and a nominal ethylene content of 50%.

Elastomer (E)—an ethylene-propylene copolymer rubber having a minimum viscosity average molecular weight of approximately 120,000, a minimum Mooney viscosity of 35 and a melt index of from 0.35 to 0.5 dg/min.

Elastomer (F)—an ethylene-propylene diene terpolymer manufactured by Dupont of Canada Ltd. and sold under the trade name NORDEL 1500 and having a melt index below 0.3.

Elastomer (G)—synthetic natural rubber.

Elastomer (H)—an elastomer manufactured by Polysar Corp. and sold under the trade name POLYSAR BUTYL 111.

Elastomer (I)—an elastomer manufactured by B.F. Goodrich and sold under the trade name EPCAR 847.

It can be seen from the above example that Elastomer (A) gave the best cling properties while Elastomers (B), (C), (D) and (E) gave effective results. It is apparent that ethylene-propylene copolymer rubbers are effective as the other elastomers were judged unsuitable.

Also various quantities of powdered polypropylene (up to 4% of the total mixture) were added to some samples of Elastomer (B). It was found that 1.0% of polypropylene gave the best results with Elastomer (B).

EXAMPLE 5

In this example the effects of polyisobutylene of various molecular weights and viscosities on the cling properties of the resulting film are illustrated. The mixtures each comprised 5% by weight of the respective polyisobutylene, 10% by weight of ethylene-propylene copolymer rubber having an ethylene/propylene ration of from 40/60 to 60/40 and a melt index of from 0.35 to 0.5 dg/min., and the remainder of the mixture being polyethylene having a density of approximately 0.9225 gm/cc and a melt index of about 0.8 dg/min. Film samples each of one mil thickness were prepared from each of the respective mixtures and their instant cling characteristics observed.

| Polyisobutylene Used | Instant Cling Properties |
| --- | --- |
| PIB (A) | Excellent |
| PIB (B) | Poor |
| PIB (C) | Poor |
| PIB (D) | Very Good |

In this example the characteristics of the various polyisobutylenes were as follows:

PIB (A)—a polyisobutylene having a Staudinger molecular weight of approximately 10,000, a viscosity average molecular weight of 50,000 and a number average molecular weight of 8,000.

PIB (B)—a polyisobutylene having a Staudinger molecular weight of 3,000.

PIB (C)—a polyisobutylene having a Staudinger molecular weight of 50,000.

PIB (D)—a polyisobutylene having a Flory molecular weight of above 37,000 and a room temperature viscosity similar to PIB (A).

EXAMPLE 6

Samples of film were prepared by extruding a homogeneous mixture of 5% by weight of polyisobutylene having a Staudinger molecular weight of approximately 10,000, a viscosity average molecular weight of 50,000 and a number average molecular weight of 8,000, 10% by weight of an ethylene-propylene copolymer rubber having an ethylene/propylene ratio of from 40/60 to 60/40, and a melt index of from 0.35 to 0.5 dg/min., the remainder being polyethylene having a density of approximately 0.9225 and a melt index of about 0.8 dg/min. Various samples of the mixture were homogeneously mixed in a Banbury type mixer and extruded on a tubular film line at various temperatures and bubble frost line heights. It was found that cling properties increased with extrusion temperature as well as frost line height. Taking into account other factors such as extruder operation and bubble stability, it was found that an extrusion temperature of from 210° C. to 215° C. and a 15 to 20 inch frost line height for a 5 inch diameter die was most suitable. When the temperature was sufficiently high (above 195° C.) opaqueness in the film became distinct as it emerged from the die lip. The film turned transparent at the frost line. It was found that the more intense this phenomenon was displayed, the better the instant tackiness of the extruded film.

EXAMPLE 7

Further samples of film extruded from the homogeneous mixture described in Example 6 were wrapped around a collection of boxes and then packed in dry ice (solid carbon dioxide) for two days. Several other samples were placed in an oven at 60° C. for one week. The cling characteristics of both the cooled and the heated films both in terms of instant cling and long term cling were preserved.

EXAMPLE 8

A homogeneous mixture was prepared consisting of (a) 5% by weight of polyisobutylene having a Staudinger molecular weight of approximately 10,000, a viscosity average molecular weight of 50,000 and a number average molecular weight of 8,000; (b) 10% by weight of an ethylene-propylene copolymer having an ethylene/propylene ratio of from 40/60 to 60/40 and a melt index between 0.35 and 0.5 dg/min. as determined by ASTM test D1238 at 44 psig and 190° C.; (c) the remainder of the mixture being an ethylene-vinyl acetate copolymer wherein vinyl acetate comprises 8% of the copolymer. The cling strength of film samples prepared from the mixture was found to be approximately equivalent in cling performance to poly(vinyl chloride) film. I claim:

The embodiments of the invention in which an exclusive property or privilege is claimed are defined as follows:

1. A composition which comprises a mixture of:
   (a) from 2% to 10% by weight of polyisobutylene having a Staudinger molecular weight of from about 3,000 to about 50,000;
   (b) from 3% to 20% by weight of an ethylene-propylene copolymer rubber having a melt index of from about 0.2 to about 2.0 dg/min. and an ethylene/propylene copolymerization ratio of from about 30/70 to about 70/30;
   (c) the remainder of said mixture being an olefin polymer selected from the group consisting of polyethylene having a density of from about 0.159 to about 0.930 gm/cc and a melt index of from about 0.3 to about 5.0 dg/min. and an ethylene-vinyl acetate copolymer wherein vinyl acetate comprises up to about 20% of the copolymer.

2. A film made from the composition described in claim 1.

3. A composition as claimed in claim 1 wherein said olefin polymer is polyethylene having a density of from about 0.915 to about 0.930 dg/cc and a melt index of from about 0.3 to about 5.0 dg/min.

4. A film made from the composition described in claim 3.

5. A composition which comprises a mixture of:
   (a) from 2% to 10% by weight of polyisobutylene having a Staudinger molecular weight of from about 7,000 to about 20,000;
   (b) from 3% to 20% by weight of an ethylene-propylene copolymer having a melt index of from about 0.35 to about 0.5 dg/min. and an ethylene/propylene copolymerization ratio of from about 40/60 to about 60/40;
   (c) the remainder of said mixture being polyethylene having a density of from about 0.920 to about 0.925 gm/cc and a melt index of from about 0.6 to about 1.5 dg/min.

6. A film made from the composition described in claim 5.

7. A composition as claimed in claim 5 wherein the mixture comprises from 3.5% to 7.0% by weight of (a) from 5% to 15% by weight of (b) and the remainder of said mixture being (c).

8. A film made from the composition described in claim 7.

* * * * *